(12) United States Patent
Cieplewski et al.

(10) Patent No.: US 8,007,580 B2
(45) Date of Patent: Aug. 30, 2011

(54) MATERIAL USED TO COMBAT THERMAL EXPANSION RELATED DEFECTS IN HIGH TEMPERATURE CASTING PROCESSES

(75) Inventors: Jeffrey J. Cieplewski, Waukesha, WI (US); Andrew Callan, Wauwatosa, WI (US); Rebecca Roti, Wauwatosa, WI (US)

(73) Assignee: IGC Technologies, LLC, Milwaukee, WI (US)

( * ) Notice: Subject to any disclaimer, the term of this patent is extended or adjusted under 35 U.S.C. 154(b) by 460 days.

(21) Appl. No.: 12/266,356

(22) Filed: Nov. 6, 2008

(65) Prior Publication Data

US 2009/0114364 A1  May 7, 2009

Related U.S. Application Data

(60) Provisional application No. 60/986,112, filed on Nov. 7, 2007.

(51) Int. Cl.
*B22C 1/02* (2006.01)
*B22C 1/08* (2006.01)

(52) U.S. Cl. ...... 106/38.9; 106/38.2; 523/139; 164/138; 164/523

(58) Field of Classification Search ................ 106/38.2, 106/38.22, 38.27, 38.3, 38.9; 164/523, 528, 164/529, 138; 523/139
See application file for complete search history.

(56) References Cited

U.S. PATENT DOCUMENTS

| | | | |
|---|---|---|---|
| 2,818,620 A | | 1/1958 | Moore |
| 4,093,467 A | * | 6/1978 | Lyass et al. ............ 106/38.35 |
| 4,152,167 A | * | 5/1979 | Horvitz et al. ............ 501/111 |
| 4,264,052 A | | 4/1981 | Radtke et al. |
| 4,345,003 A | | 8/1982 | Matsushima et al. |
| 4,347,890 A | | 9/1982 | Ailin-Pyzik et al. |
| 4,432,798 A | * | 2/1984 | Helferich et al. ............ 106/38.3 |
| 4,514,227 A | | 4/1985 | Szabo |
| 4,594,105 A | | 6/1986 | Grimm et al. |
| 4,624,898 A | | 11/1986 | Moore et al. |
| 4,636,262 A | | 1/1987 | Reed |
| 5,057,155 A | | 10/1991 | Nakayama et al. |
| 5,911,269 A | | 6/1999 | Brander et al. |
| 6,391,942 B1 | | 5/2002 | Chang et al. |
| 6,972,302 B2 | | 12/2005 | Baker et al. |
| 2005/0258405 A1 | | 11/2005 | Sayala et al. |

OTHER PUBLICATIONS

PCT International Search Report and Written Opinion mailed Jan. 12, 2009, for Application No. PCT/US08/82849 filed Nov. 7, 2008.

* cited by examiner

*Primary Examiner* — David M Brunsman
(74) *Attorney, Agent, or Firm* — Brian G. Gilpin; Godfrey & Kahn, S.C.

(57) ABSTRACT

An additive to foundry sand molding and core aggregates is used to produce sand cores and molds comprising kyanite, spodumene, titanium dioxide, ilmenite and black iron oxide. The additive produces a sand-based foundry molding and core aggregate which resists the formation of some of the defects commonly associated with the production of castings produced by silica sand-based molding and core aggregates. In particular, the additive improves the quality of castings poured at temperatures higher than those of the pouring temperatures of molten iron, such as in steel castings, and in iron castings with "hot spots."

4 Claims, 1 Drawing Sheet

MATERIAL USED TO COMBAT THERMAL EXPANSION RELATED DEFECTS IN HIGH TEMPERATURE CASTING PROCESSES

CROSS REFERENCE TO RELATED APPLICATION

This application claims the benefit of provisional U.S. Application No. 60/986,112, filed Nov. 7, 2007, which is specifically incorporated herein by reference under 35 U.S.C. §119(e).

FIELD OF THE INVENTION

The present invention relates to metal founding, and more particularly to a method of making a sand-based mold which effectively combats the thermal expansion of chemically bonded sand at temperatures higher than those of the pouring temperatures of molten iron.

BACKGROUND OF THE INVENTION

Iron oxides have been used for years in foundry applications to improve core properties and the quality of castings. Iron oxides have proven to be advantageous as an additive to foundry molding aggregates containing silica sand to improve the quality of castings by reducing the formation of thermal expansion defects, such as veining, scabs, buckles, and rat tails as well as gas defects, such as pinholes and metal penetration. There are several iron oxides which are currently used in foundries today. These include red iron oxide, also known as hematite ($Fe_2O_3$), black iron oxide, also known as magnetite ($Fe_3O_4$) and yellow ochre. Another iron oxide which is presently being used is Sierra Leone concentrate which is a hematite ore black in color. Red iron oxide and black iron oxide are the most popular iron oxides in use.

The currently accepted method of employing the above iron oxides is to add approximately 1-3% by weight to the sand mold aggregates during mixing. The exact mechanism by which iron oxides affect surface finish is not totally understood. However, it is generally believed that the iron oxides increase the hot plasticity of the sand mixture by the formation of a glassy layer between the sand grains which deforms and "gives," without fracturing at metallurgical temperatures, to prevent fissures from opening up in the sand, which in turn reduces veining.

Various other types of additives have also been employed in an attempt to improve core properties and the quality of sand castings. For example, other anti-veining compounds which have been used in sand aggregate mixtures include starch based products, dextrin, fine ground glass particles, red talc and wood flour, i.e. particles of wood coated with a resin. All of these additives have met with limited success in reducing veining.

Currently, minerals containing lithia are utilized in the glass, glaze, and enamel industries as a fluxing agent. Also, in Nakayama et al, U.S. Pat. No. 5,057,155, a lithium mineral is added to a mold-forming composition to function as an expansive agent during heating and firing of ceramic molds used in the investment casting industry. According to Nakayama et al, the mold-forming composition irreversibly expands during firing of the mold in proportion to the amount of lithium mineral present to provide dimensional accuracy for castings by compensating for solidification shrinkage which occurs during cooling of poured metals such as titanium and the like used, for example, in dental castings. However, Nakayama et al fails to teach using a lithia-containing compound such as α-spodumene as an anti-veining agent in sand-based foundry molding and core mixtures.

U.S. Pat. No. 5,911,269 to Brander et al., which is incorporated herein by reference, teaches a method of making a silica sand-based foundry mold wherein thermal expansion defects, i.e. veining, are reduced by adding a lithia-containing material in a sufficient amount to the silica sand mold to provide about 0.001% to about 2.0% of lithia, wherein the addition of lithia is accomplished by adding lithium bearing minerals. A sand-based aggregate of silica sand, binder, and lithia-containing material is disclosed, where the silica sand comprises from about 80% to about 90% of the aggregate, the binder contains about 0.5-10% of the aggregate, and the lithia-containing material provides from about 0.001% to about 2.0% of lithia. The addition of lithia is accomplished by adding lithium bearing materials such as α-spodumene, amblygonite, montebrasite, petalite, lepidolite, zinnwaldite, eucryptite or lithium carbonate.

A specific formulation of a lithia additive as disclosed in Brander et al. was developed, and is commercially known as "Veinseal 14000." The formulation for Veinseal 14000 is: 68.00% lithia-based material; 7.00% metallic oxide; 25.00% "filler material." The filler material is $TiO_2$-containing ilmenite. The Veinseal 14000 product is an effective anti-veining agent that is used at a minimum effective concentration of about 5% based on sand weight (B.O.S.) of the sand cores.

U.S. Pat. No. 6,972,302 to Baker et al. teaches an anti-veining material comprising less than about 4% by weight of a lithia-containing material, and at least about 1% by weight of ferric oxide ($Fe_2O_3$), with the anti-veining material preferably comprising 2.5% $Li_2O$, 10-25% of $TiO_2$, 15-25% $Al_2O_3$, 10-25% of $Fe_3O_4$, and 60-70% of $SiO_2$ mixed with about 1% by weight of $Fe_2O_3$, preferably red iron oxide. In Baker et al., thermal expansion of sand cores and unwanted veins in the metal casting formed thereby are substantially eliminated with the use of less than 4% by weight of lithia-containing anti-veining agents, such as the Veinseal 14000 product, combined with the use of an effective amount of ferric oxide ($Fe_2O_3$), at least about 1% by weight, thereby reducing the quantity of lithia-containing anti-veining agent needed by adding ferric oxide, resulting in a reduction in cost without a decrease in the quality of the castings.

The effective temperature ranges for the effectiveness of the additives in the prior art are not fully detailed. In the casting process, non-ferrous alloys (aluminum, brass, bronze, etc.) are poured between 1200 and 2200° F., molten iron is poured between 2450 and 2750° F., and steel is poured between 2750 and 3000° F. Brander recites temperatures in the 2600-2800° F. range in experiments in which iron was poured. Neither Brander nor Baker discuss the performance of the lithia-containing materials plus metallic oxides blend when they are exposed to higher temperatures, like those in the steel casting process.

The commercial product, Veinseal 14000, is ineffective in preventing the thermal expansion defects in foundry sand cores that are used to make steel castings. When this formula is implemented to combat thermal expansion in cores used in the steel casing process, the results achieved when used with iron castings are not achieved at the higher steel temperature. Instead, the veining defect is prevalent. It is believed that the higher temperatures of steel (2750 to 3000° F.) cause the sand additive to bypass the "fluxing" stage and actually melt. The result is a core with no plasticity. In a core with no plasticity, as the thermal expansion of the sand takes place, the surface integrity of the core is broken and veining occurs. The phenomenon also occurs in iron castings where the temperature at the sand core/molten iron interface is greater than 2750° F. These regions, known as "hot spots," are where the geometries of the castings and sand cores allow for thick metal sections (greater than three inches) to be in contact with thin sand sections. The heat generated cannot be dissipated, and the sand additive "melts" and is rendered ineffective.

Accordingly, a need exists for an additive which effectively combats the thermal expansion of chemically bonded sand at temperatures higher than those of the pouring temperatures of molten iron. Such an additive must eliminate veining defects in steel castings and in iron castings with "hot spots," where the existing commercial products such as Veinseal 14000 and others are ineffective.

SUMMARY OF THE INVENTION

The present invention relates to a method of making silica sand mold and core aggregates utilizing lithium-containing additives. The lithium-containing additive provides a source of lithia ($Li_2O$). Typically, the mold or core mixture may comprise between about 80% to about 99% of silica sand, and about 0.5% to about 10% of a binder. The additive is mixed with foundry sand molding and core aggregates to improve the quality of castings by reducing thermal expansion defects in castings poured at temperatures higher than those of the pouring temperatures of molten iron, for example in steel castings and in iron castings with "hot spots." The existing lithia/metallic oxide containing formulations are improved by adjusting the formulation to provide anti-veining capabilities at temperatures of greater than about 2750° F.

The present invention has several advantages and benefits over the prior art. Other objects, features and advantages of the present invention will become apparent after viewing the following detailed description.

DETAILED DESCRIPTION OF THE INVENTION

Figure 1:
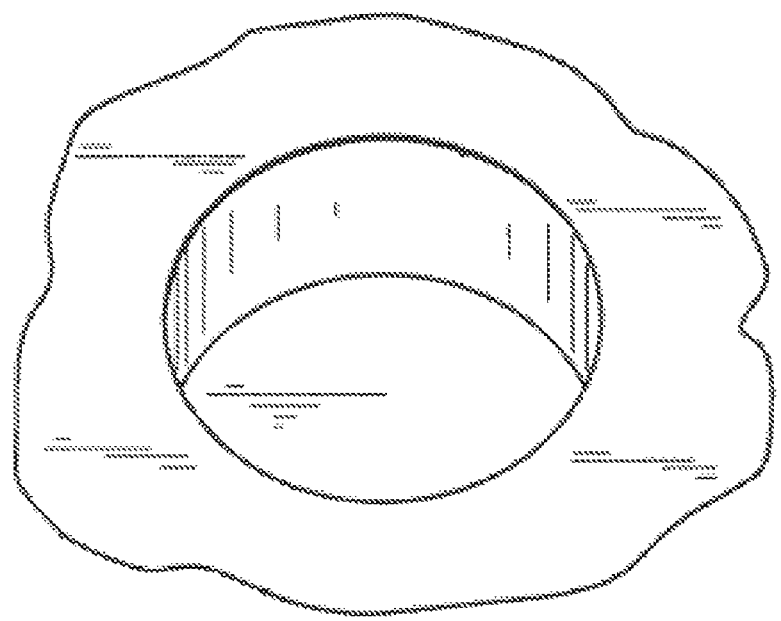
FIG. 1 is a perspective view of a test casting illustrating the results of the use of a lithia/metallic oxide containing material in accordance with the present invention to produce a sand mold with a rating of "0," free of veining defects.

An additive to foundry sand molding and core aggregates is used to produce sand cores and molds. The additive produces a sand-based foundry molding and core aggregate which resists the formation of some of the defects commonly associated with the production of castings produced by silica sand-based molding and core aggregates. In particular, the additive improves the quality of castings poured at temperatures higher than those of the pouring temperatures of molten iron, such as in steel castings and in iron castings with "hot spots."

The additive of the present invention may be used with conventional foundry silica sand molding and core aggregates used in the manufacture of sand-based molds and cores. Such mold and core aggregates are usually made from silica sand, with the sand grains being bound together with a mechanical or chemical means. Typically, the mold or core mixture may comprise between about 80% to about 99% of silica sand, and about 0.5% to about 10% of a binder. The binder used may be any of numerous conventional core and mold binder systems such as phenolic hot box, phenolic urethane, furan, sodium silicate including ester and carbon dioxide system, polyester binders, acrylic binders, alkaline binders, epoxy binders, and furan warm box systems. Each of the above binder systems is well known in the art and therefore a detailed description thereof is unnecessary.

The additive of the present invention includes kyanite, titanium dioxide, ilmenite, black iron oxide, and spodumene, a lithia-containing additive added in a sufficient amount to the aggregate to provide about 0.001% to about 2.0% of lithium oxide ($Li_2O$) commonly referred to as lithia. The addition of lithia to the aggregate is accomplished by adding lithia from a material such as α-spodumene, amblygonite, montebrasite, petalite, lepidolite, zinnwaldite, eucryptite or lithium carbonate. Each of these materials is a lithia source and may be employed depending upon the particular sand-based aggregate and binder system being utilized. All of the above-described lithia sources are commercially available and typically contain about 3% to about 10% lithia with the exception of lithium carbonate which has about 40% lithia. The current formulation for the prior art, the Veinseal 14000 product in a commercially available embodiment, is: 68.00% lithia-based material; 7.00% Metallic Oxide; 25.00% "filler material."

The preferred new formulation for the lithia-based additive, hereinafter referred to as "02-055," is as follows:

40% Kyanite, 30% Spodumene, 15% Titanium Dioxide, 11% Ilmenite and 4% Black Iron Oxide This 02-055 formulation contains kyanite, which has a melting temperature of 2750° F., in conjunction with the lithia-based material/metallic oxide blend. This combination of constituents is believed to work synergistically to form a highly viscous substance at or near the pouring temperatures of molten steel (2750 to 3000° F.). By using a mineral with a high melting/softening point (kyanite) and combining it with other effective materials, the additive will cause the sand mixture to flux, or form a highly viscous medium at or around the target temperature (here, the temperature of molten steel). This is accomplished by using a combination of minerals that work synergistically to generate this viscous medium. The result is a sand core which has "plasticity" at high temperatures (2750 to 3000° F.) allowing for the thermal expansion of sand to occur without breaking the surface integrity of the bonded sand core. Such a sand core can thus also be assumed to be effective in "hot spots" of iron castings, where the fluxing action of the sand additive needs to be elevated to temperatures at or near "hot spot" temperatures of 2750 to 3000° F.

Kyanite ($3Al_2O_3 \cdot 3SiO_2$) has the same chemical composition as andalusite and sillimanite, but differs in crystal structure and physical properties. Kyanite has an approximate analysis of: 54-60% Alumina, 37-43% Silica, 0.16-1.0% Ferric Oxide, 1.20% Titanium Oxide, 0.5% Alkalies. At about 2750F, kyanite decomposes into mullite and silica with an accompanying decrease in specific gravity. The effect of this volume change on the resultant product depends largely on the grain size of the kyanite. Kyanite is available raw and calcined to mullite. While the mullite form is quite stable as to volume change under heat, the raw form shows definite and substantial expansion, depending upon grain size and temperature. This property permits the use of raw kyanite as a balance against clay shrinkage in refractory bodies and it is, therefore, widely used in high-performance cements, ramming mixes, monolithics, specialities and mortars. While kyanite first became popular in the clay products field, it is now being used in ceramic bodies. This is due to the well-known interlocking property of the crystal which gives much added mechanical strength to all ceramic compositions, even when fired at low heats during manufacturer. The result has been a rapidly increasing use of kyanite in sanitary porcelains, wall tile, precision casting molds, brake disks, electrical porcelains and filters. The preferred form of kyanite for use in the 02-055 formulation is a 35 mesh raw kyanite.

Spodumene is a lithium aluminum silicate having the formula $Li_2O$—$Al_2O_3$-$4SiO_2$. Spodumene offers a high amount of lithia to the formulation as compared to other lithia-containing minerals (i.e. Lepidolite, Amblygonite). Also, spodumene is generally more commercially available than other lithia-containing minerals. Lithium is the lightest, smallest and most reactive of the alkali metals. In addition, lithium possesses the smallest ionic radius and the highest ionic potential. These factors combine to produce an extremely powerful flux.

Ilmenite has the formula $FeO$—$TiO_2$ and has a melting point of 2489° F. Ilmenite is a source of titanium dioxide ($TiO_2$), which is widely used in ceramic glazes. Titanium dioxide ($TiO_2$) has a melting point of about 3370° F. Titanium dioxide is used in ceramic glazes to affect acid resistance, color and texture. TiO2 is present in ilmenite, and it is theorized that adding $TiO_2$ in a concentrated, more pure form, results in a more potent flux, thus reducing the dependency on the amount of spodumene (lithium based material) needed to "flux" or "activate" the system at the elevated temperatures. Black iron oxide is used to improve the surface finish of the cast metal pieces, and has melting point of 2498° F.

The synergistic effect of the combination of the minerals in 02-055 fluxes, or softens, at or just below the pouring temperatures of molten steel (2750 to 3000° F.). The resultant "substance" formed is a material high in viscosity that allows for the thermal expansion of chemically bonded sand to occur without jeopardizing the surface integrity of the sand core used in the casting process. The 02-055 material thus adds "plasticity" to a rigid sand core, allowing it to move without cracking.

Figure 2:
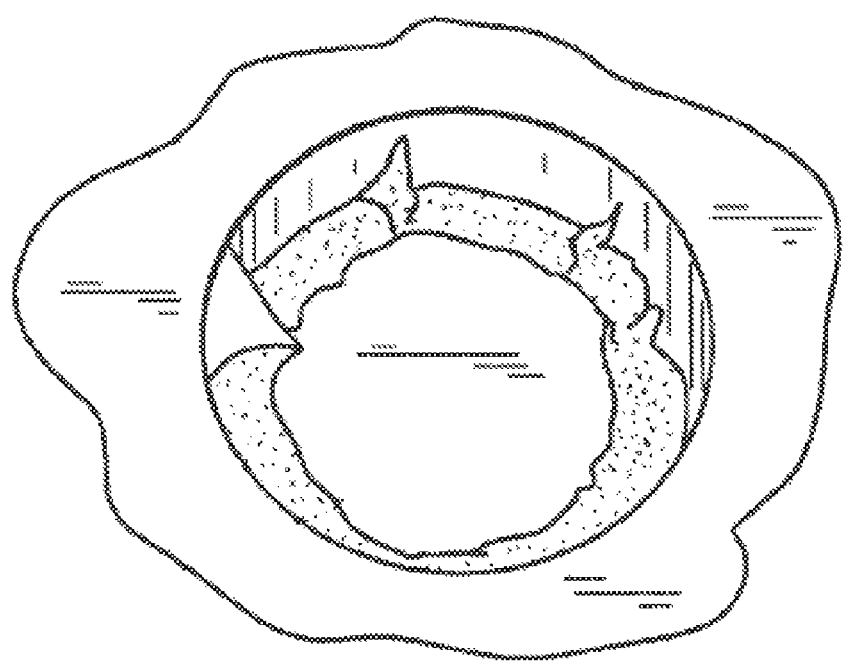
FIG. 2 is a perspective view of a test casting illustrating the results of a sand mold with a rating of "5," having massive veining/penetration.

To test the new formulation, small sample cylindrical cores were prepared. The samples were prepared for testing and illustration purposes only. Standard sand batch preparation is a blend of 1500.00 grams Badger 55 sand, 1.20% B.O.S. of a phenolic urethane resin system as a binder, and 7.00% B.O.S. of the 02-055 anti-veining additive. The mixture is formed into a cylindrical rod (a core) as illustrated in FIGS. 1 and 2, with a diameter of 2 inches and a height of 2 inches. Variations to the sand preparation can be made to evaluate the impact of the sand additive on certain characteristics such as core tensile strengths and binder levels.

The manufactured cores are then placed in a sand mold and sent through the steel casting process, the steel having a pouring temperature between 2750 to 3000° F. The resultant castings include cylindrical cavities whose cylindrical surfaces are characterized by the amount of veining (thermal expansion defects) present.

The ratings provided below for the results of each sample are based on visual observations of the surface finish of the test castings, and the lower number the better or more improved the quality of the casting. The ratings are based on the following legend:

0=No veining/no penetration
1=Slight veining and/or slight penetration
2=About 25% of core area contains veining and/or penetration
3=About 50% of core area contains veining and/or penetration
4=About 75% of core area contains veining and/or penetration
5=Massive veining and/or penetration Experiment The experiment utilized three sample formulations: Sample 1 was the control core, containing no additive; Sample 2 used the prior art Veinseal 14000 product; Samples 3 and 4 utilized kyanite for the additive; and Sample 5-9 utilized the new 02-055 formulation for the additive. Table 1 summarizes the results of the experiment.

Sample 1:
1500.00 grams Badger 55 sand blended with 1.20% B.O.S phenolic urethane cold box resin. No additive was added to the aggregate. This is the control core. The resulting casting showed obvious thermal expansion defects (veining) noted throughout the entire casting cavity. The rating for this casting is 4

Sample 2:
1500.00 grams Badger 55 sand blended with 1.20% B.O.S phenolic urethane cold box resin blended with 7.00% B.O.S. Veinseal 14000. The resulting casting showed obvious thermal expansion defects (veining) noted throughout the entire casting cavity. The rating for this casting is 4.

Sample 3:
1500.00 grams Badger 55 sand blended with 1.20% B.O.S phenolic urethane cold box resin blended with 7.00% B.O.S. kyanite. The rating for this casting is 4.

Sample 4:
An additional sample with the same formulation used in Sample 3 (500.00 grams Badger 55 sand blended with 1.20% B.O.S phenolic urethane cold box resin blended with 7.00% B.O.S. kyanite). The rating for this casting is 4.

Sample 5:
1500.00 grams Badger 55 sand blended with 1.20% B.O.S phenolic urethane cold box resin blended with 7.00% B.O.S. 02-055. The results revealed casting cavity free of veining defects, similar to that illustrated in FIG. 1. The rating for this casting is 0.

Sample 6:
An additional sample with the same formulation used in Sample 5 (1500.00 grams Badger 55 sand blended with 1.20% B.O.S phenolic urethane cold box resin blended with 7.00% B.O.S. 02-055). The results revealed casting cavity free of veining defects. The rating for this casting is 0.

Sample 7:
An additional sample with the formulation 1500.00 grams Badger 55 sand blended with 1.20% B.O.S phenolic urethane cold box resin blended with 7.00% B.O.S. 02-055. The results revealed casting cavity free of veining defects. The rating for this casting is 0.

Sample 8:
An additional sample with the formulation 1500.00 grams Badger 55 sand blended with 1.20% B.O.S phenolic urethane cold box resin blended with 7.00% B.O.S. 02-055. The results revealed casting cavity free of veining defects. The rating for this casting is 0.

Sample 9:
An additional sample with the formulation 1500.00 grams Badger 55 sand blended with 1.20% B.O.S phenolic urethane cold box resin blended with 7.00% B.O.S. 02-055. The results revealed casting cavity free of veining defects. The rating for this casting is 0.

TABLE 1

| Sample | Additive | Result/Rating |
| --- | --- | --- |
| 1 | Control/No Additive | 4 |
| 2 | Veinseal 14000 (7.00% B.O.S.) | 4 |
| 3 | Kyanite (7.00% B.O.S.) | 4 |
| 4 | Kyanite (7.00% B.O.S.) | 4 |
| 5 | 02-055 (7.00% B.O.S.) | 0 |
| 6 | 02-055 (7.00% B.O.S.) | 0 |
| 7 | 02-055 (7.00% B.O.S.) | 0 |

TABLE 1-continued

| Sample | Additive | Result/Rating |
|--------|----------|---------------|
| 8 | 02-055 (7.00% B.O.S.) | 0 |
| 9 | 02-055 (7.00% B.O.S.) | 0 |

The experiment demonstrates that kyanite blended with the lithia-containing mineral/metallic oxide blend form a highly viscous substance at temperatures at or around 2750 to 3000° F. When this blend is added to chemically bonded sand cores and used in the steel casting process, the results are steel castings free of veining defects. The Veinseal 14000 product is ineffective at temperatures at or around 2750 to 3000° F. The use of kyanite only as an anti-veining additive is also ineffective, because when it softens/fluxes at the temperature of the molten metal, it does not form a medium with the desired viscosity to add the proper "plasticity" to the chemically bonded sand core to prevent the thermal expansion defect from occurring. It is when kyanite is in combination with the other active fluxing agents in the formulation that a medium with the desired viscosity to add "plasticity" to the chemically bonded sand core is achieved.

Although the invention has been herein described in what is perceived to be the most practical and preferred embodiments, it is to be understood that the invention is not intended to be limited to the specific embodiments set forth above. Rather, it is recognized that modifications may be made by one of ordinary skill in the art of the invention without departing from the spirit or intent of the invention and, therefore, the invention it so be taken as including all reasonable equivalents to the subject matter of the appended claims and the description herein.

What is claimed is:

1. A material used to combat thermal expansion defects in silica sand foundry molds or cores at temperatures higher than those of the pouring temperatures of molten iron, said material comprising kyanite, spodumene, titanium dioxide, ilmenite and black iron oxide.

2. The material of claim 1, wherein said material comprises about 40% kyanite, about 30% spodumene, about 15% titanium dioxide, about 11% ilmenite, and about 4% black iron oxide.

3. A method of making a metal casting from silica sand foundry molds or cores at temperatures higher than those of the pouring temperatures of molten iron comprising the steps of:

preparing a mixture comprising at least about 80% by weight of silica sand, between about 0.5% to about 10% by weight of a binder, and at least about 7% by weight of a material used to combat thermal expansion defects, said material comprising kyanite, spodumene, titanium dioxide, ilmenite and black iron oxide;

shaping said mixture to form the sand mold or core having a desired pattern therein; and pouring molten metal into said pattern, allowing the molten metal to cool and harden, and removing the mold or core to produce a metal casting.

4. The material of claim 3, wherein said material comprises about 40% kyanite, about 30% spodumene, about 15% titanium dioxide, about 11% ilmenite, and about 4% black iron oxide.

* * * * *